US012564844B2

(12) United States Patent
Chapron

(10) Patent No.: US 12,564,844 B2
(45) Date of Patent: Mar. 3, 2026

(54) CONTAINER GRINDING SYSTEM CONTAINING OR HAVING CONTAINED A PLANT PROTECTION PRODUCT

(71) Applicant: Exel Industries, Epernay (FR)

(72) Inventor: Fabien Chapron, Reims (FR)

(73) Assignee: Exel Industries, Epernay (FR)

( * ) Notice: Subject to any disclaimer, the term of this patent is extended or adjusted under 35 U.S.C. 154(b) by 392 days.

(21) Appl. No.: 18/349,045

(22) Filed: Jul. 7, 2023

(65) Prior Publication Data

US 2024/0017265 A1 Jan. 18, 2024

(30) Foreign Application Priority Data

Jul. 18, 2022 (FR) ...................................... 2207355

(51) Int. Cl.
| | |
|---|---|
| *B02C 23/18* | (2006.01) |
| *B02C 18/14* | (2006.01) |
| *B02C 18/22* | (2006.01) |
| *B02C 19/00* | (2006.01) |
| *B02C 23/04* | (2006.01) |
| *B02C 23/20* | (2006.01) |
| *B02C 23/40* | (2006.01) |
| *B09B 3/35* | (2022.01) |
| *B09B 101/10* | (2022.01) |
| *B09B 101/00* | (2022.01) |

(52) U.S. Cl.
CPC ............ *B02C 23/18* (2013.01); *B02C 18/142* (2013.01); *B02C 18/2216* (2013.01); *B02C 19/0093* (2013.01); *B02C 23/04* (2013.01); *B02C 23/20* (2013.01); *B02C 23/40* (2013.01); *B09B 3/35* (2022.01); *B09B 2101/007* (2022.01); *B09B 2101/10* (2022.01)

(58) Field of Classification Search
CPC .......... B02C 19/0093; B09B 2101/007; B09B 2101/10
See application file for complete search history.

(56) References Cited

U.S. PATENT DOCUMENTS

2008/0213124 A1* 9/2008 Heng ........................ B09B 3/35
422/301

FOREIGN PATENT DOCUMENTS

| | | | | | |
|---|---|---|---|---|---|
| AT | 384988 B | * | 2/1988 | ............. | B29B 13/10 |
| FR | 2644373 A1 | * | 9/1990 | ........... | B30B 9/3035 |
| JP | H119041 A | * | 1/1999 | | |

(Continued)

OTHER PUBLICATIONS

Search Report from the French Intellectual Property Office on corresponding FR application (FR2207355) dated Feb. 15, 2023.

*Primary Examiner* — Jared O Brown
(74) *Attorney, Agent, or Firm* — Alumen IP Law PC

(57) ABSTRACT

A container grinding system having a box equipped with a closing device coupled to a first safety device, the box having a container introduction opening arranged in a top part of the box and capable of being closed by the closing device, the grinding system having a grinder having at least one grinding shaft for shredding chipped containers, a filtering basket recovering the ground material from the grinding of containers, and a set of rinse nozzles, the grinding system being configured so that following the introduction of a container into the box for grinding the same, the first safety device inhibits the operation of the grinder as long as the closing device does not ensure closing of the box.

16 Claims, 8 Drawing Sheets

(56)                    References Cited

FOREIGN PATENT DOCUMENTS

| WO | WO-9012602 | A1 | * | 11/1990 | ............... H05B 6/78 |
| WO | 2004009144 | A1 | | 1/2004 | |
| WO | WO-2012134289 | A1 | * | 10/2012 | ......... B02C 19/0075 |
| WO | WO-2013058653 | A1 | * | 4/2013 | ......... B02C 18/0084 |

* cited by examiner

[Fig. 1]
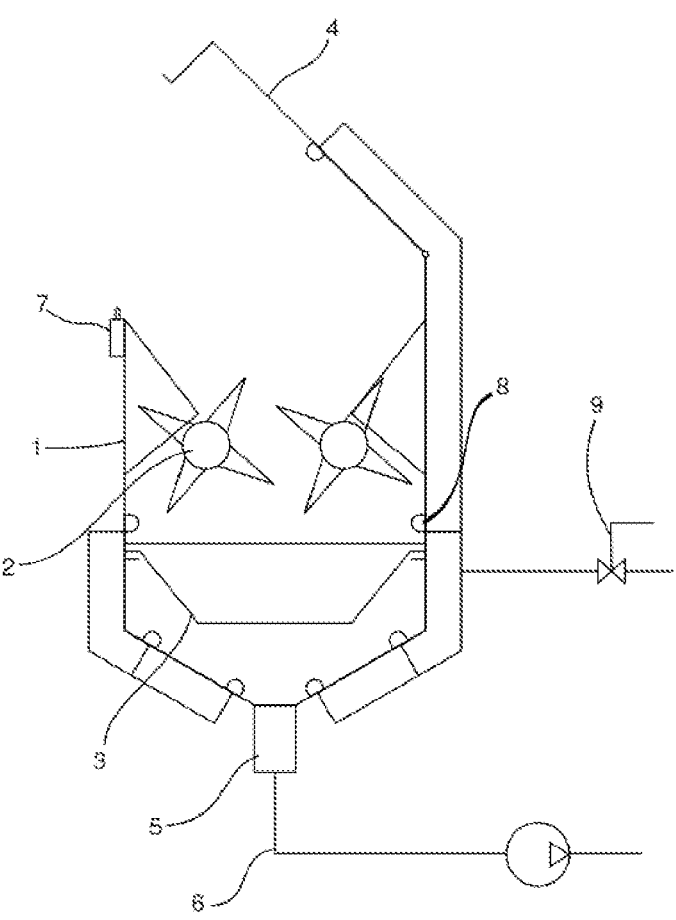

[Fig. 2]
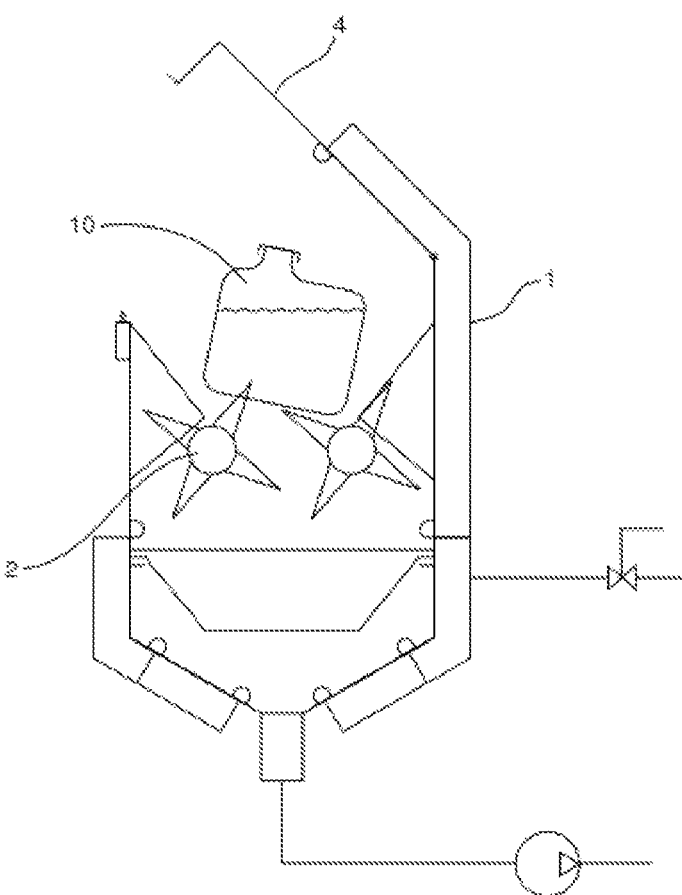

[Fig. 3]
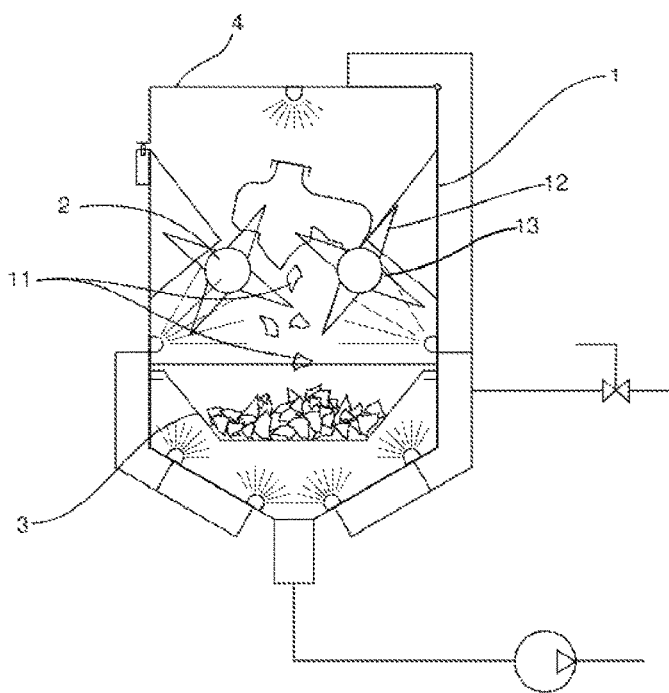
[Fig. 4]
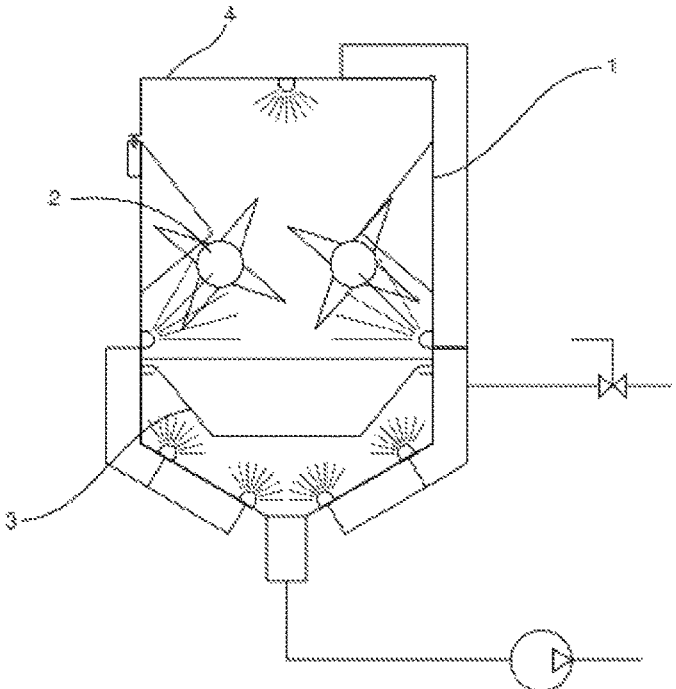

[Fig. 5]
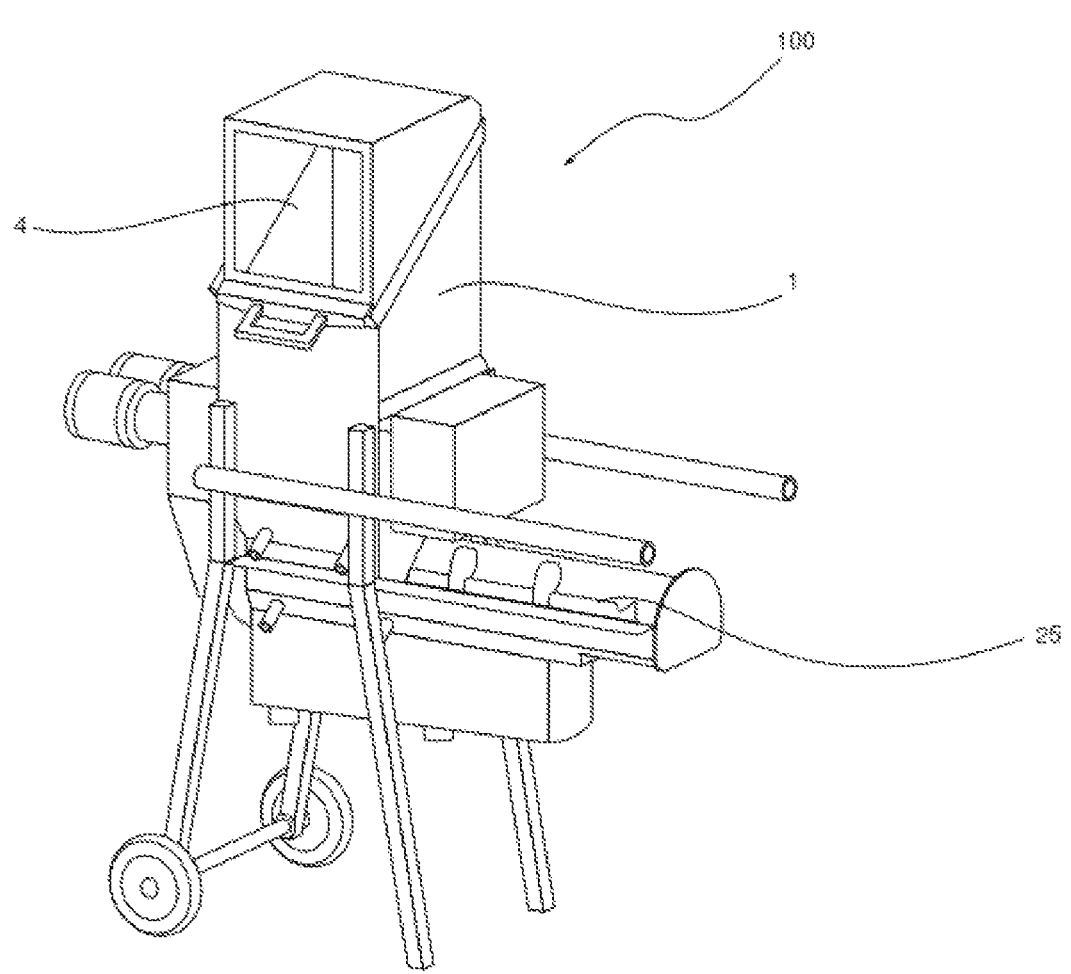

[Fig. 6]
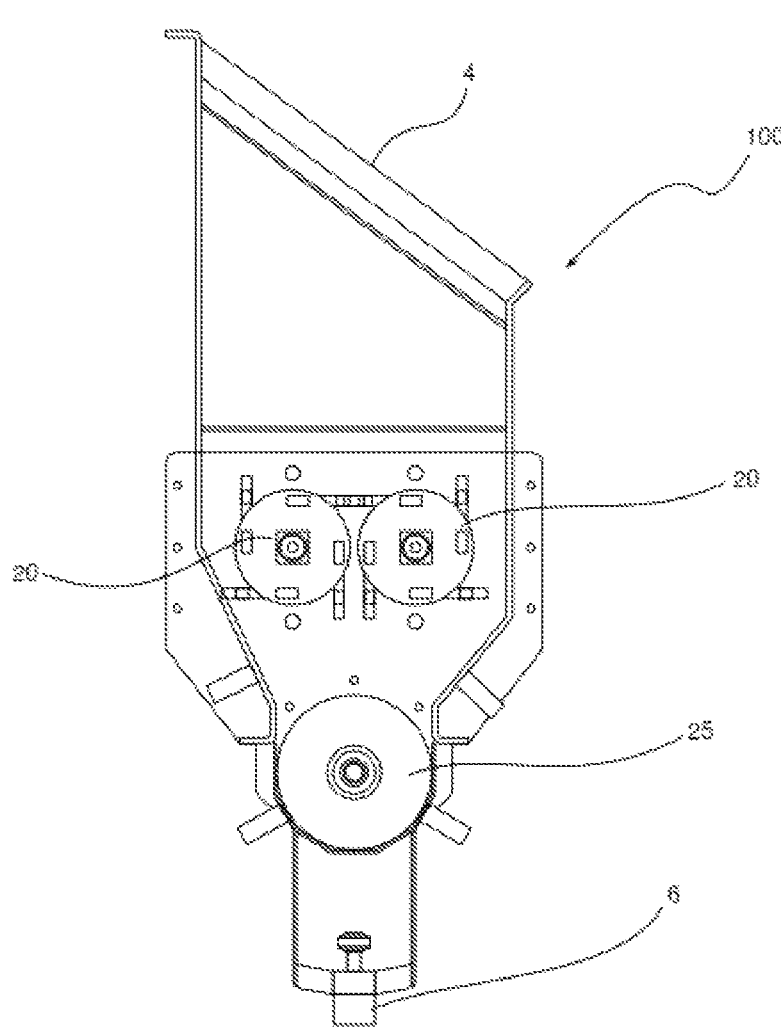

[Fig. 7]
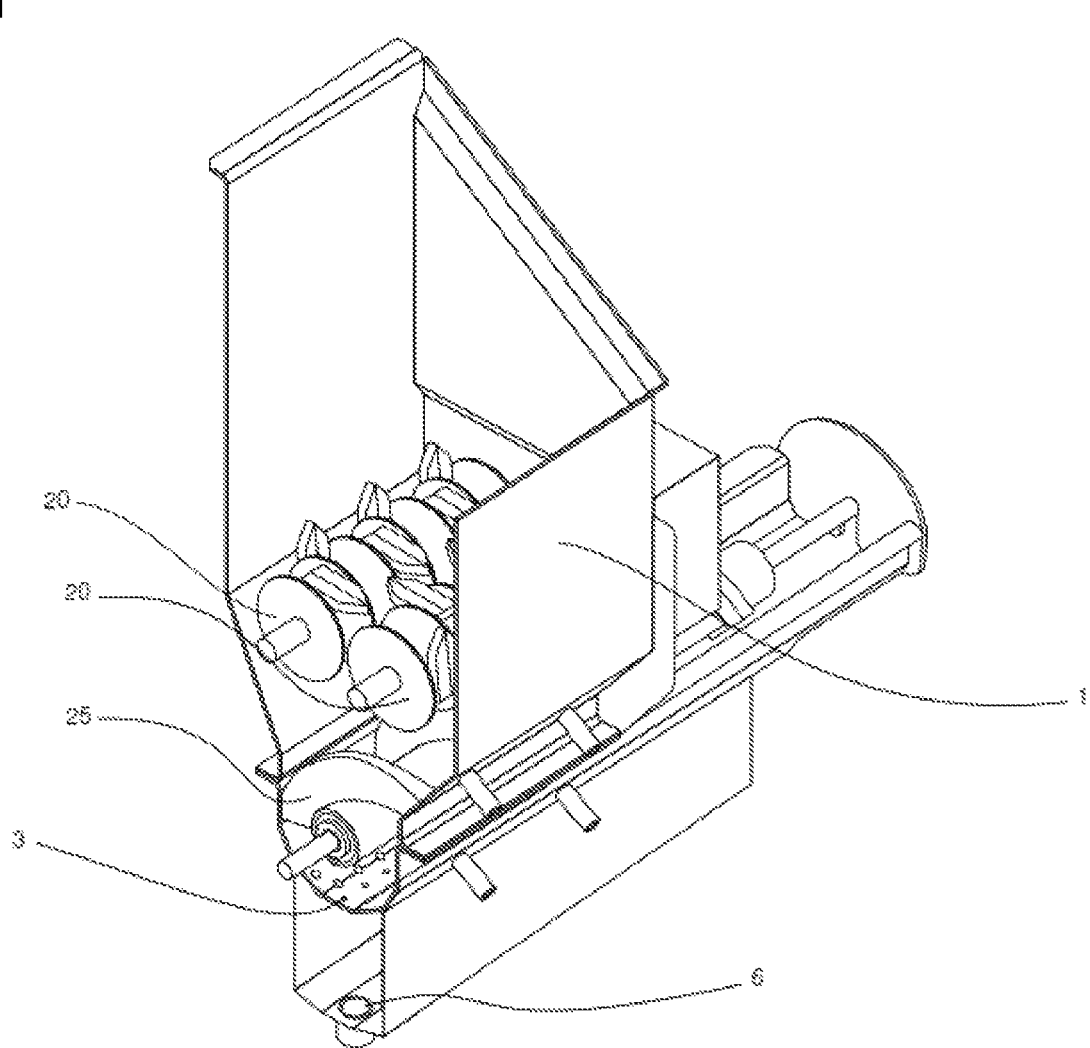

[Fig. 8]
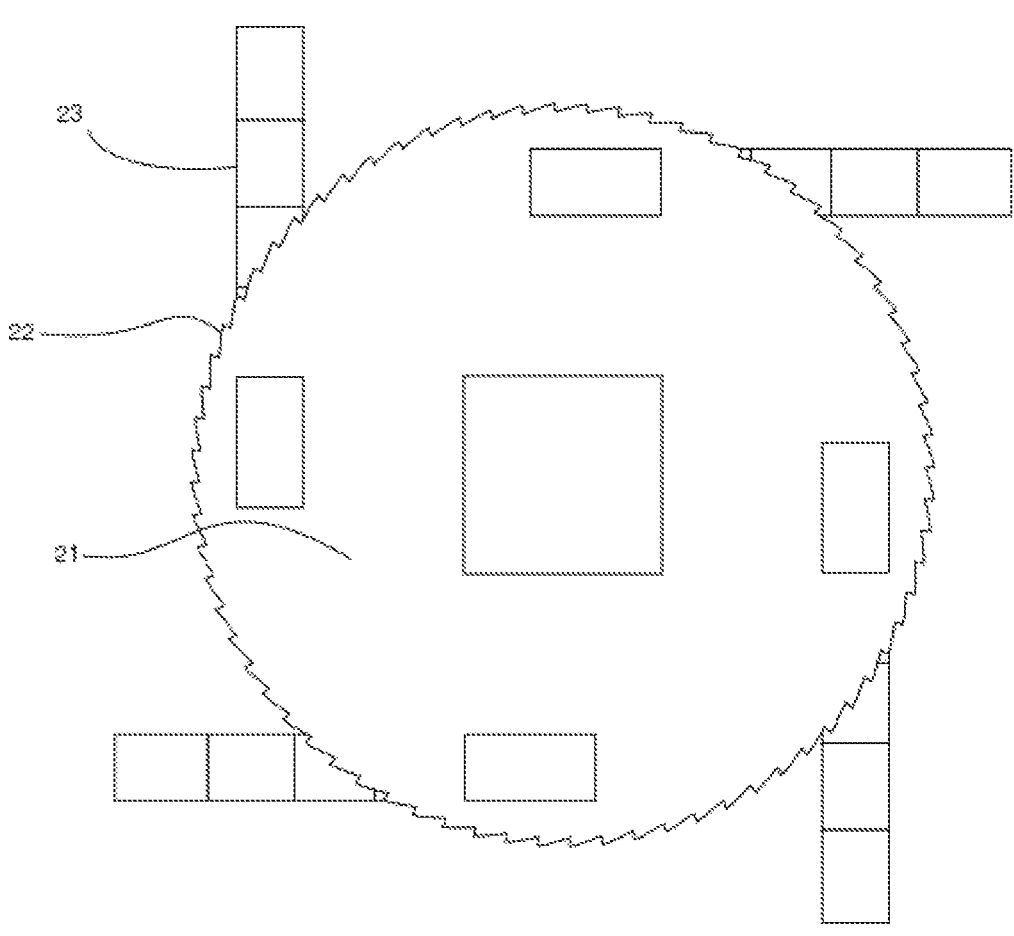

[Fig. 9]
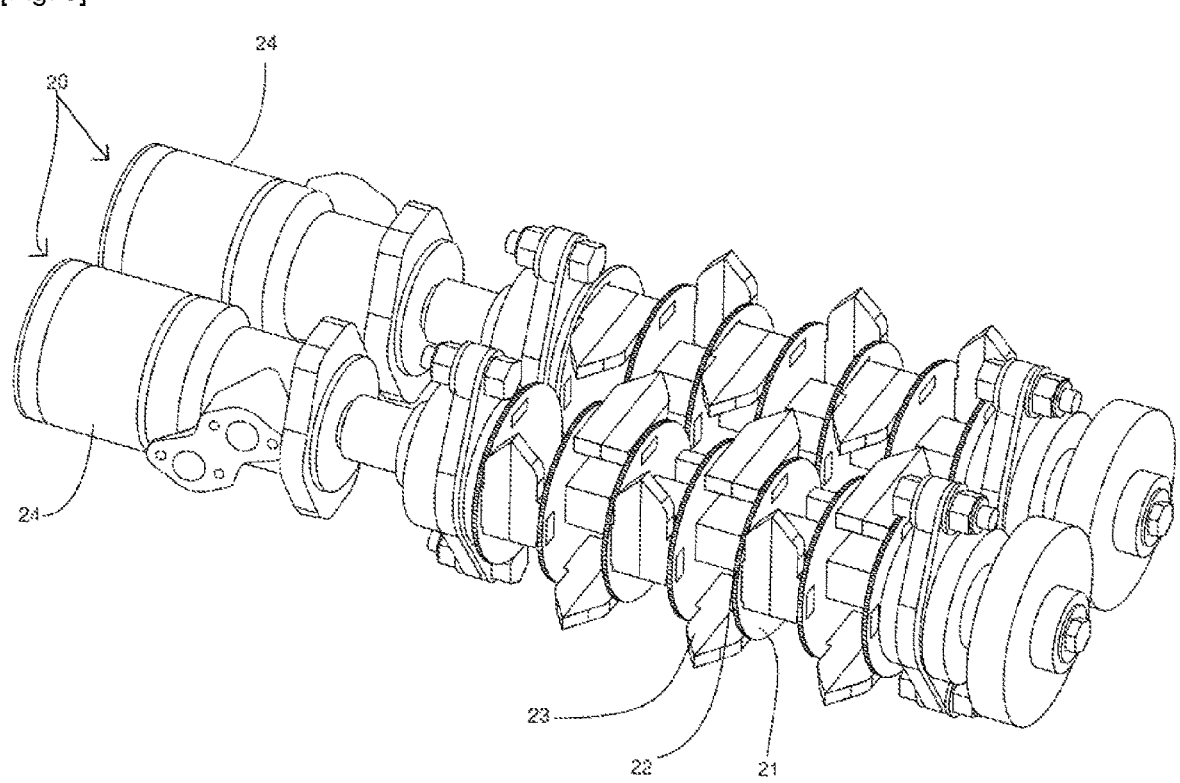

CONTAINER GRINDING SYSTEM CONTAINING OR HAVING CONTAINED A PLANT PROTECTION PRODUCT

TECHNICAL FIELD

The present invention relates to the field of agricultural spraying and relates to a system for grinding containers, such as cans, bags or pouches, containing or having contained a plant protection product. More precisely, the invention resides in a container grinding system configured to grind containers in a confined and secure environment, making it possible to recover the ground material and the liquid from the grinding.

BACKGROUND

As is well known, in the field of agricultural spraying, one or more liquid, granulated or powdered plant protection products are incorporated into one or more tanks of an agricultural spray system that can be self-propelled, carried or trailed.

Especially, the plant protection product may be transferred to the tank(s) from one or more containers, in particular cans, containing the liquid, granulated or powdered plant protection product(s).

In general, plant protection products are introduced into the sprayer through an incorporation hopper. This hopper is in the form of a large funnel into which the operator pours the contents of the plant protection product containers directly, manually. Or the operator pours the plant protection product directly into the manhole of the sprayer tank.

There are also closed transfer systems known as CTS (Closed Transfer System) for a transfer from the can to the sprayer, operating by gravity or forced suction.

In both cases, the operator has to handle full plant protection product containers, which can weigh up to 20 kg. When using an incorporation hopper, this handling is performed with the container opened beforehand, generating a risk of accidental spillage.

Each time, regardless of the system used, handling operations and the limited drainage speed reduce the overall worksite throughput.

Above all, once the plant protection product has been transferred to a tank in a spray system, the more or less empty container remains to be treated in a secure way for the operator. Thus, a technical problem lies in the treatment of containers once the transfer of plant protection product has been performed. The containers in question may or may not be empty. The purpose is to rinse and crush containers into chips in a secure way for the operator, as plant protection products can have some toxicity.

There is therefore a need for a secure system for grinding containers containing or having contained a plant protection product.

SUMMARY

To this end, one object of the invention is a container grinding system comprising a box equipped with a closing device, the sealed box comprising a container introduction opening arranged in a top part of the box and capable of being closed by the closing device, and the box comprising, in a bottom part of the box, a set of walls converging towards a suction pipe capable of being connected to a tank of a spray system, the grinding system comprising a grinder arranged in a central part of the box, the grinder comprising at least one grinding shaft for shredding chipped containers, a filtering basket recovering the ground material from the grinding of containers, and a set of rinse nozzles.

Advantageously, the closing device is coupled to a first safety device, the container grinding system being configured so that, following the introduction of a container into the box for grinding the same, the first safety device inhibits the operation of the grinder as long as the closing device does not ensure the effective closing of the box.

The use of a grinding system according to the invention makes it possible to avoid any risk of splashing plant protection product when grinding containers. The grinding system according to the invention enables the grinding of empty, partially full or full plant protection product containers, directly, as well as the reduction of the volume of waste.

The present invention thus makes it possible to reduce the risks of pollution during an accidental spillage of a non-empty container, to significantly reduce contact by splashing with the operator, to reduce the risk of musculoskeletal disorders by reducing container handling operations, to reduce the volume of container waste and to optimize the total time of incorporation of the different containers of liquid, granulated or powdered plant protection products into a spray system.

According to one embodiment, the container grinding system according to the invention comprises a second safety device configured to inhibit the opening of the closing device of the box as long as the set of rinse nozzles is active.

Advantageously, the container grinding system comprises a filter sieve upstream of the suction pipe.

The filter sieve located in the lower part of the box and upstream of the suction pipe connecting the device to a spray system has a filtration size finer than the filtering basket, consistent with the type of pump equipping the spray system, and can be removable by the operator for cleaning. Alternatively, the sieve could be rotary to spin the chips constituting the ground material, in the same way as a spin dryer.

According to one embodiment, the grinding shaft(s) are equipped with knives coupled to counter-knives.

The knives and counter-knives are especially configured to obtain a minimum controlled grain size of the ground material for shredding a full product container.

According to one embodiment, the grinding shafts are equipped with rotating disks provided with teeth.

Advantageously, the teeth are present around the entire perimeter of the disk(s), evenly distributed in a saw tooth pattern.

According to one embodiment, the container grinding system comprises two parallel grinding shafts, each grinding shaft comprising a plurality of rotating disks orthogonal to the grinding shaft, spaced apart and parallel to each other, with at least one off-axis hook between each pair of rotating disks, the rotating disks and the respective off-axis hooks of each grinding shaft being staggeredly arranged.

According to one embodiment, the filtering basket is arranged immediately downstream of the grinding shaft(s), in order to recover the ground material from the container, the filtering basket having perforated walls so as to enable the ground material to be washed through nozzles of the set of nozzles.

According to one embodiment, the filtering basket is removable from the box to ensure the discharge of the ground material by the operator. Alternatively, a shaker can be provided to move the ground material chips to the bottom of the filtering basket in order to rinse all faces.

According to one embodiment, the filtering basket has a cylindrical opening at its base and has, substantially in its middle, a continuous ground material discharge system passing therethrough, the ground material discharge system being a worm screw or a pusher cylinder or a conveyor belt or any type of adapted conveyor.

Advantageously, the worm screw has, on at least the exterior of its spiral, a flexible element in contact with the filtering basket, the flexible element being formed of brush bristles or a flexible rubber seal, configured to prevent jamming of the ground material.

According to one embodiment, the set of rinse nozzles comprises, in a top part of the box, at least one rinse nozzle adapted to wash upper portions of inner faces of the walls of the box, in a central part of the box, at least one rinse nozzle adapted to wash the grinder, and, in a bottom part of the box, at least one rinse nozzle adapted to wash the ground material in the filtering basket recovering the ground material, as well as to wash lower portions of the inner faces of the walls of the box. Alternatively, the water used on the upper part and on the intermediate central part may be a slurry, that is a mixture of water and plant protection product, from a main tank of a spray system, in order to save clear water. According to another alternative, a complete pre-rinsing is carried out by means of slurry, followed by rinsing of the ground material with clear water.

According to one embodiment, the container grinding system comprises one or more synchronized electric or hydraulic motors configured to rotatably drive the grinding shaft(s). Any other type of motor or engine can also be used, such as a mechanical motor, an engine, the connection to a power take-off of an agricultural machine, etc.

The present invention also relates to a spray system comprising at least one tank intended to contain plant protection product and at least one tank of clear water, the spray system comprising a grinding system such as briefly described above, the suction pipe being connected to the tank intended to contain plant protection product and the set of rinse nozzles being supplied with water through a rinse pipe connecting the set of nozzles to the tank of clear water. In line with the alternatives discussed above, the set of nozzles can also be supplied with slurry through a dedicated pipe, in order to perform rinsing in the upper and central part or pre-rinsing.

BRIEF DESCRIPTION OF THE DRAWINGS

The invention will be better understood upon reading the following description, given solely as an example, and by referring to the accompanying figures, given as non-limiting examples, in which identical references are given to similar objects and in which:

FIG. 1 is a schematic representation of a first embodiment of the grinding system according to the invention, open and empty;

FIG. 2 is a schematic representation of the first embodiment of the grinding system according to the invention, open and with a full can introduced into the box;

FIG. 3 is a schematic representation of the first embodiment of the grinding system according to the invention, closed and in operation;

FIG. 4 is a schematic representation of the first embodiment of the grinding system according to the invention, in the final rinse phase;

FIG. 5 is a schematic representation of a second embodiment of the grinding system according to the invention;

FIG. 6 is a schematic representation of a sectional view of the second embodiment;

FIG. 7 is a perspective view of the interior of the grinding system according to the second embodiment;

FIG. 8 is a schematic representation of a side view of a rotating disk, according to the second embodiment of the grinding system according to the invention;

FIG. 9 is a schematic representation of two grinding shafts in the second embodiment of the grinding system according to the invention.

It should be noted that the figures disclose the invention in detail in order to enable the implementation of the invention; although non limiting, said figures are especially used to better define the invention where applicable.

DETAILED DESCRIPTION

The invention relates to a system for grinding containers (cans, bags, pouches, etc.), containing or having contained liquid, granulated or powdered plant protection products, which may especially present a significant toxicity for the operator.

The invention aims at ensuring better safety for the operator and better protection of the environment by ensuring grinding of containers containing or having contained plant protection products in a secure and confined manner. After grinding, rinsed container chips are recovered. Dirty rinse water can be sucked for incorporation into a tank of a spray system.

It is specified here that the container grinding system according to the invention can either be integrated into a spray system or be a so-called "stand alone" independent system. In the following, the container grinding system as such is described; all the characteristics and alternatives described below are provided to be compatible with both the version of the container grinding system integrated into a spray system or the "stand alone" version.

The embodiments described in detail below are represented in a "stand alone" form but they could be fully integrated into a spray system without changing their essential characteristics. Furthermore, in the following, the case where the container is in the form of a can is more particularly described. It is obvious that the container grinding system according to the invention is used identically with other types of containers, such as bags or pouches.

The grinding system according to the invention is in the form of a box having an opening for inserting containers, especially cans, which can be sealed through a closing device such as a hatch or cover. Especially, the introduction opening has an adequate dimension for passing a 20-liter can. The grinding system is equipped with at least one grinding shaft, a set of rinse nozzles and a basket for receiving the container ground material.

Preferably, the grinding system is connected to a spray system by a suction pipe intended to incorporate, into a tank of the spray system, the dirty rinse water having been used in the grinding system, and by a second pressurized clear water feed pipe, for example from a tank of clear water of the spray system, to supply the rinse nozzles. Alternatively, the second pipe can be connected to a fixed or on-board water supply system, independent of the spray system.

With reference to FIG. 1, a first embodiment of the container grinding system according to the invention is set forth. The box 1 has here a grinder equipped with two grinding shafts 2 and a filtering basket 3. The grinding shafts 2 are driven via an electric or hydraulic or mechanical motor or engine or via a connection to a power take-off of an agricultural machine, etc. In an upper part, the box 1 comprises a container introduction opening and a device for closing the box adapted to close the container introduction opening. The closing device here is in the form of a hinged hatch 4 preferably at least partly having a transparent wall to make visual inspection of the interior of the box 1 possible. The closing device is preferably provided with sealing means, such as an O-ring, so that it ensures sealed closing of the box 1. The box 1 is thus sealed when closed.

In a lower part of the housing 1, the container grinding system according to this embodiment comprises a second filter 5 connected to the suction of a spray system through a pipe 6.

A first safety device 7 (described below) prevents the grinding shafts 2 from rotating as long as the hatch 4 is not closed.

A set of rinse nozzles 8 is arranged inside the box 1. The set of nozzles 8 can be activated manually via a valve 9 enabling pressurized clear water to rinse the interior of the grinding system. Alternatively, the set of nozzles can be activated automatically, at the start, during, or at the end of grinding, for example after a preset time from the start of grinding. Especially, the set of rinse nozzles 8 comprises, in a top part of the box, at least one rinse nozzle adapted to wash upper portions of inner faces of the walls of the box 1, in a central part of the box, at least one rinse nozzle adapted to wash the grinder, and, in a bottom part of the box 1, at least one rinse nozzle adapted to wash the ground material in the filtering basket 3 recovering the ground material as well as to wash lower portions of the inner faces of the walls of the box 1.

According to a preferred embodiment, the container grinding system comprises a second safety device (not represented) configured to inhibit the opening of the closing device of the box, here the hatch 4, as long as the set of rinse nozzles 8 is active. By virtue of the second safety device, no water or even dirty water can be splashed onto the operator. Indeed, pressurized water sprayed via the rinse nozzles could cause splashing of dirty water sprayed onto the operator in case of untimely opening of the hatch 4. According to one embodiment, a means for measuring the concentration of plant protection product is provided in the lower part of the box 1 to measure the concentration of plant protection product in the dirty rinse water. In this case, the means for measuring the concentration of plant protection product in the water may be connected to the second safety device so as to inhibit any opening of the hatch 4 as long as the concentration of plant protection product in the dirty water is above a predefined threshold.

With reference to FIG. 2, the container grinding system is represented in which a can 10 full of plant protection product, or, alternatively, partially full or substantially empty, is introduced into the box 1 and placed on the grinding shafts 2 when stationary. The hatch 4 is open. As long as the hatch 4 is open, the grinding shafts cannot be rotated, by virtue of the first safety device 7 (described below).

According to the invention, when the grinder is in operation, the can is ground by the rotating grinding shafts 2, the ground materials are recovered in the filtering basket 3, the set of rinse nozzles 8 is supplied with clear water, enabling the ground materials 11 to be washed from their creation to their recovery in the filtering basket 3.

In FIG. 3, the grinding shafts 2 are equipped with knives 12 and counter-knives 13 enabling an adequate grain size of the ground material 11 to be obtained, especially for optimally rinsing the same once it has fallen into the filtering basket 3.

The set of rinse nozzles 8 is configured to generate clear water jets powerful enough to rinse the ground material 11 as well as all the walls of the box 1. The filtering basket 3 has perforations on its walls in order to enable the water jets to strike the ground material 11. Through these perforations, the part of the ground material 11 with a low grain size can hence pass. Therefore, a second filter 5 may be provided to enable this type of ground material chips having a finer grain size to be sieved and recovered, before being sent to the spray system by suction in the pipe 6. The second filter 5 can be coupled to a suction circuit configured to reverse the flow in order to unclog the second filter and facilitate its cleaning.

FIG. 4 sets forth the grinding system empty of any ground material while rinsing. The set of rinse nozzles 8 is activated in order to complete the system washing.

In order to guarantee operator safety, it is necessary to prevent and/or stop the rotation of the grinding shafts 2 if the hatch 4 is not closed properly. The first safety device 7 is provided to detect the position of the hatch 4. The first safety device 7 may comprise a contactor, especially an electrical or hydraulic or mechanical or optical contactor, depending on the design of the system for driving the grinding shafts 2. Thus, as long as the contactor detects that the hatch 4 is open, activation of the grinding shafts is inhibited, in other words not possible.

In order to optimize the worksite throughput and reduce the operator's handling operations, the rotation of the grinding shafts 2 and the activation of the rinse nozzles 8 can be automated according to a predefined automatic cycle. For example, the grinding system may comprise a sequencing module configured so that, with the grinding system energized, the grinding shafts 2 and the set of rinse nozzles 8 are automatically activated upon detection of the correct closing of the hatch 4. Especially, the grinding shafts 2 and the set of nozzles 8 may stop automatically after having operated during a grinding cycle and a rinse cycle having a predetermined respective duration.

Once the grinding cycle and rinsing cycle are complete, the operator has to empty the ground material 11 contained in the filtering basket 3. This filtering basket 3 can slide like a drawer on one of the sides of the box 1. A third safety device may also be provided to secure this opening.

In an alternative to the first embodiment, the basket 3 can be emptied using a worm screw continuously to avoid the operator having to discharge the ground material manually. In this case, the basket 3 can be fixed. The worm screw 25 is represented below in FIGS. 5, 6, 7 showing a second embodiment of the grinding system according to the invention. Especially, the worm screw 25 has, on at least the exterior of its spiral, a flexible element in contact with the filtering basket 3, the flexible element being formed of brush bristles or a flexible rubber seal, configured to avoid jamming of the ground material.

Another embodiment is represented in FIGS. 5 to 9. Unlike the preceding embodiment, as represented in FIGS. 7 to 9 especially, the grinding shafts 20 are here equipped with rotating toothed disks 22. Only the grinder, in other words the grinding shaft(s), differ. The other aspects of the grinding system already described remain valid for the second embodiment. The grinding shafts 20 are rotatably driven by electric or hydraulic motor(s) or, alternatively, engine(s) 24. Alternatively, the grinding shafts 20 can be driven by means of a connection to a power take-off of an agricultural machine.

The container grinding system 100 according to the second embodiment is also represented in a "stand alone" version. However, it could, as the first embodiment, be integrated into a spray system. The container grinding system 100 is arranged here on a frame with castors to improve its mobility.

Similar to that described in the first embodiment, the container grinding system 100 has a box 1 having a container introduction opening adapted to be closed by a closing device in the form of a hinged hatch 4.

A can may be introduced through the open hatch 4 and arranged on the grinding shafts 20. The first safety device (not represented here) enables the operation of the grinder to be inhibited. In other words, the safety device prevents the grinding shafts 20 from rotating as long as the hatch 4 is not closed, especially in a secure and sealed manner.

When the hatch is closed, the grinder can be activated. The grinding shafts 20 are then rotated by the motors or engines 24, driving with them the rotating disks 21 whose saw-tooth periphery 22 is adapted to grind the can, regardless of whether the can is empty, partially full or full.

FIG. 8 shows a rotating disk 21 viewed from the side. Saw teeth 22 are present on the entire periphery of the rotating disk 21.

More precisely, with reference to FIG. 6, 7 or 9, the grinder may have two grinding shafts 20 arranged parallel to each other in a central part of the box 1. Each grinding shaft 20 is equipped with a plurality of rotating disks 21, orthogonal to the axis of the grinding shaft 20, spaced apart and parallel to each other. Each rotating disk 21 has on its periphery the saw teeth 22 already discussed.

Each grinding shaft 20 thus comprises, in the embodiment represented, a set of rotating disks 21 whose periphery is in a saw tooth pattern. Between each pair of disks 21, hooks 23 can be provided to steer the can or the can pieces between the grinding shafts 20 so that they are shredded by the saw teeth 22. The rotating disks 21 and the hooks 23 of a grinding shaft 20 and those of the other grinding shaft 20 are staggeredly arranged, as represented especially in FIG. 8. For example, between each pair of disks 21, there are four off-axis hooks extending on an axis parallel to a tangent to the disks 21 and distributed every 90°.

In the second embodiment, the operation of the first safety device is identical.

Similarly, the operation of the set of rinse nozzles is similar to that described for the preceding embodiment. The second safety device configured to prevent opening of the box 1 as long as the set of rinse nozzles is active is also preferably present.

Also, the dirty rinse water recovered in the lower part of the grinding system is preferably sucked via a pipe 6 to be incorporated into a tank of a spray system. To this end, a suction system may be provided connecting the pipe 6 to a point downstream of an incorporation hopper of the spray system. Such a suction system is for example achieved by means of a venturi supplied with pressure by a pump of the spray system and sucking the contents of the hopper.

Clear water supply is always either via a feed pipe conveying pressurized clear water from a tank of a spray system or from an outer, fixed or on-board water supply system.

The present invention also relates to a spray system integrating a grinding system as described in detail previously. In this case, the pipe 6 is connected to a tank of the spray system and the set of rinse nozzles 8 is supplied with water via a rinse pipe connecting it to a tank of clear water of the spray system.

It is specified that for all the embodiments, it is preferably also provided, before the final discharge of the chips constituting the container ground material, a centrifugal drying system or an air blower device, in order to remove the remaining dirty water being in the ground material.

The invention claimed is:

1. A container grinding system comprising:
a box comprising a closing device moveable between an open position and a closed position, a container introduction opening arranged in a top part of the box and capable of being closed by the closing device, and the box further comprising, in a bottom part of the box, a set of walls converging towards a suction pipe capable of being connected to a tank of a spray system,
a grinder arranged in a central part of the box, the grinder comprising at least one grinding shaft equipped with knives for shredding a container, a filtering basket recovering ground material obtained from grinding the container, and a set of rinse nozzles,
a first safety device coupled to the closing device, wherein the first safety device inhibits operation of the grinder when the closing device is not in the closed position; and
wherein the filtering basket is arranged immediately downstream of the grinder, in order to recover the ground material, the filtering basket having perforated walls so as to enable the ground material to be washed using the set of rinse nozzles.

2. The container grinding system according to claim 1, comprising a filter sieve upstream of the suction pipe.

3. The container grinding system according to claim 1, comprising counter-knives that cooperate with the knives.

4. The container grinding system according to claim 3, wherein the knives are rotating disks equipped with teeth.

5. The container grinding system of claim 4, wherein the teeth are arranged around an entire perimeter of the disks, evenly distributed in a saw tooth pattern.

6. The container grinding system according to claim 4, wherein the at least one grinding shaft comprises two parallel grinding shafts, each grinding shaft comprising pairs of the plurality of rotating disks arranged orthogonal to the grinding shaft, spaced apart and parallel to each other, with at least one off-axis hook between each pair of the rotating disks, the rotating disks and the off-axis hooks of each grinding shaft being staggered relative to each other.

7. The container grinding system according to claim 1, wherein the filtering basket is removable from the box to ensure discharge of the ground material by an operator.

8. The container grinding system according to claim 1, wherein the filtering basket comprises a base having a cylindrical opening and has, substantially in a middle of the filtering basket, a continuous ground material discharge system passing therethrough, the ground material discharge system being a worm screw or a pusher cylinder or a conveyor belt.

9. The container grinding system according to claim 8, wherein the ground material discharge system is a worm screw comprising a spiral having a flexible element on an exterior of the spiral, the flexible element being in contact with the filtering basket, the flexible element being formed of brush bristles or a flexible rubber seal, and configured to avoid jamming of the ground material.

10. The container grinding system according to claim 1, wherein the set of rinse nozzles comprises, in a top part of the box, at least one rinse nozzle adapted to wash upper portions of inner faces of walls of the box, in a central part of the box, at least one rinse nozzle adapted to wash the grinder, and, in a bottom part of the box, at least one rinse nozzle adapted to wash the ground material in the filtering basket recovering the ground material as well as to wash lower portions of the inner faces of the walls of the box.

11. The container grinding system according to claim 1, comprising at least one synchronous electric or hydraulic motor configured to rotatably drive the at least one grinding shaft.

12. A spray system comprising:
at least one tank configured to contain plant protection product and at least one tank of clear water,
a container grinding system according to claim 1, the suction pipe being connected to the tank configured to contain plant protection product and the set of rinse nozzles being supplied with water through a rinse pipe connecting the set of nozzles to the tank of clear water.

13. A container grinding system comprising:
a box comprising a closing device moveable between an open position and a closed position, a container introduction opening arranged in a top part of the box and capable of being closed by the closing device, and the box further comprising, in a bottom part of the box, a set of walls converging towards a suction pipe capable of being connected to a tank of a spray system,
a grinder arranged in a central part of the box, the grinder comprising two parallel grinding shafts equipped with knives for shredding a container, counter-knives that cooperate with the knives, a filtering basket recovering ground material from grinding the container, and a set of rinse nozzles,
a first safety device coupled to the closing device, wherein the first safety device inhibits operation of the grinder when the closing device is not in the closed position;
wherein the knives comprise pairs of rotating disks equipped with teeth and arranged orthogonal to the grinding shafts, the rotating disks are spaced apart and parallel to each other, with at least one off-axis hook between each pair of rotating disks, the rotating disks and off-axis hooks of each grinding shaft being staggered relative to each other.

14. A spray system comprising:
at least one tank configured to contain plant protection product and at least one tank of clear water,
a container grinding system according to claim 13, the suction pipe being connected to the tank configured to contain plant protection product and the set of rinse nozzles being supplied with water through a rinse pipe connecting the set of nozzles to the tank of clear water.

15. A container grinding system comprising:
a box comprising a closing device moveable between an open position and a closed position, a container introduction opening arranged in a top part of the box and capable of being closed by the closing device, and the box further comprising, in a bottom part of the box, a set of walls converging towards a suction pipe capable of being connected to a tank of a spray system,
a grinder arranged in a central part of the box, the grinder comprising at least one grinding shaft equipped with knives for shredding a container, a filtering basket recovering ground material from grinding the container, and a set of rinse nozzles,
a first safety device coupled to the closing device, wherein the first safety device inhibits operation of the grinder when the closing device is not in the closed position;
wherein the set of rinse nozzles comprises, in a top part of the box, at least one rinse nozzle adapted to wash upper portions of inner faces of walls of the box; in a central part of the box, at least one rinse nozzle adapted to wash the grinder; and, in a bottom part of the box, at least one rinse nozzle adapted to wash the ground material in the filtering basket recovering the ground material as well as to wash lower portions of the inner faces of the walls of the box.

16. A spray system comprising:
at least one tank configured to contain plant protection product and at least one tank of clear water,
a container grinding system according to claim 15, the suction pipe being connected to the tank configured to contain plant protection product and the set of rinse nozzles being supplied with water through a rinse pipe connecting the set of nozzles to the tank of clear water.

* * * * *